(12) United States Patent
Lee

(10) Patent No.: US 7,446,842 B2
(45) Date of Patent: Nov. 4, 2008

(54) LIQUID CRYSTAL DISPLAY PANEL

(75) Inventor: Ju-hyun Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 707 days.

(21) Appl. No.: 10/773,462

(22) Filed: Feb. 9, 2004

(65) Prior Publication Data

US 2005/0052381 A1 Mar. 10, 2005

(30) Foreign Application Priority Data

Feb. 8, 2003 (KR) ........................ 10-2003-0008006

(51) Int. Cl.
*G02F 1/1345* (2006.01)
(52) U.S. Cl. ...................... 349/149; 345/90; 345/100; 345/104; 257/10
(58) Field of Classification Search ................ 349/149; 345/104, 90, 100; 257/10
See application file for complete search history.

(56) References Cited

U.S. PATENT DOCUMENTS

| | | | |
|---|---|---|---|
| 6,177,916 B1 * | 1/2001 | Aoki et al. ...................... 345/87 |
| 6,492,972 B1 * | 12/2002 | Kubota et al. .............. 345/100 |
| 6,806,862 B1 * | 10/2004 | Zhang et al. ................. 345/103 |
| 6,940,214 B1 * | 9/2005 | Komiya et al. ................. 313/51 |
| 2001/0030722 A1 * | 10/2001 | Murade ....................... 349/110 |
| 2002/0079484 A1 * | 6/2002 | Yamazaki et al. ............. 257/10 |
| 2002/0190944 A1 * | 12/2002 | Morita ........................ 345/100 |
| 2003/0030615 A1 * | 2/2003 | Maeda et al. ................. 345/90 |

FOREIGN PATENT DOCUMENTS

| | | |
|---|---|---|
| JP | 7-120762 | 5/1995 |
| JP | 2000-352722 | 12/2000 |

OTHER PUBLICATIONS

Notice to Submit Response issued by the Korean Intellectual Property Office on Mar. 22, 2005 in Application No. 10-2003-0008006.

* cited by examiner

*Primary Examiner*—Julie Ngo
(74) *Attorney, Agent, or Firm*—Staas & Halsey LLP

(57) ABSTRACT

A liquid crystal display (LCD) panel including a liquid crystal panel, a first driving circuit, connected to the liquid crystal panel by a plurality of data lines, a second driving circuit, connected to the liquid crystal panel by a plurality of gate lines, an electrode pad unit applying a signal voltage aligning the liquid crystal filled in the liquid crystal panel, a first switching circuit, performing a switching operation to apply a part of the liquid crystal alignment signal voltage applied via the electrode pad unit to the liquid crystal panel via the data lines, a second switching circuit, performing a switching operation to apply a remaining part of the liquid crystal alignment signal voltage to the liquid crystal panel via the gate lines, and first and second buffer circuits, which prevent the liquid crystal alignment signal voltage from being applied backward to the first and second driving circuits.

13 Claims, 9 Drawing Sheets

LIQUID CRYSTAL DISPLAY PANEL

CROSS-REFERENCE TO RELATED APPLICATIONS

This application claims the priority of Korean Patent Application No. 2003-8006, filed on Feb. 8, 2003, in the Korean Intellectual Property Office, the disclosure of which is incorporated herein in its entirety by reference.

BACKGROUND OF THE INVENTION

1. Field of the Invention

The present invention relates to a flat display panel, and more particularly, to a liquid crystal display (LCD) panel having improved alignment stability and uniformity.

2. Description of the Related Art

Liquid crystal has both liquidity and orderly molecular arrangement, such as crystal of a solid state. In addition, the liquid crystal has optical anisotropy and has a characteristic in which, when a voltage is applied to a layer of the liquid crystal, the molecular arrangement of the liquid crystal is converted along a direction of an electric field. A device that displays graphics, characters, or figures using the property of the liquid crystal, is referred to as a liquid crystal display (LCD). The arrangement of the liquid crystal is converted depending on whether a voltage is applied to a layer of the liquid crystal. Thus, a voltage is selectively applied to the layer of the liquid crystal so that desired graphics or characters are displayed.

Typically, an LCD module, for example, a projection LCD module, includes an LCD panel comprising a liquid crystal panel, a driving circuit connected to the liquid crystal panel, and a backlight, which radiates light on one side of the liquid crystal panel. The liquid crystal panel includes liquid crystal, a color filter, an alignment film, and a polarization plate placed at both sides of the liquid crystal.

As shown in FIG. 1, a conventional LCD panel 10 includes a liquid crystal panel 12 and a driving circuit 14 placed around the liquid crystal panel 12. The liquid crystal panel 12 includes front glass plate FP and rear glass plate BP, which face each other, a common electrode (not shown) placed at a rear side of the front glass plate FP, and a display electrode layer (not shown) placed to face the common electrode. Liquid crystal is filled between the front glass plate FP and the rear glass plate BP and is in communication with the display electrode layer and the common electrode. The liquid crystal panel 12 further includes a polarization plate or a color filter. However, detailed descriptions thereof are common and thus will be omitted.

Referring to a circle showing an enlarged part of the liquid crystal panel 12 in FIG. 1, the liquid crystal panel 12 includes a thin film transistor (TFT) 12a which is a pixel driving device, and a display electrode 12b connected to a drain of the TFT 12a. A plurality of pixels are arranged in a matrix shape on the display electrode layer. The pixels consist of one TFT 12a and one display electrode 12b. Thus, a plurality of TFTs 12a and display electrodes 12b are arranged in a matrix shape on the display electrode layer. A source of each TFT 12a, corresponding to columns of the matrix shape, is connected in parallel to a data line DL, which is connected to a first driving circuit 14a of the driving circuit 14. A gate of each TFT 12a, corresponding to rows of the matrix shape, is connected in parallel to a gate line GL, which is connected to a second driving circuit 14b of the driving circuit 14. As such, a data line DL which corresponds to the number of columns of the matrix, is formed between the first driving circuit 14a and the liquid crystal panel 12, and a gate line GL which corresponds to the number of rows of the matrix, is formed between the second driving circuit 14b and the liquid crystal panel 12. The first driving circuit 14a applies a video signal to the liquid crystal panel 12 via the data line DL, and the second driving circuit 14b sequentially applies a scan signal to the liquid crystal panel 12 via a plurality of gate lines GLs in response to the video signal.

The related art LCD panel is affected by a driving circuit but is mainly affected by a characteristic of liquid crystal.

For example, when a ferroelectric liquid crystal (FLC) is used in the above-described LCD panel, a high resolution image is realized compared to existing generic liquid crystal. Due to a fast response speed, moving pictures may be realized, digital gray scale may be represented, and full color display and full digital driving may be performed in LCD's using FLC. In addition, pixel interference is reduced, and existing zigzag defects and chevron structure do not occur in a continuous director rotation (CDR) FLC mode.

As liquid crystal used in the LCD panel has been replaced with the FLC, there are more advantages compared to the use of existing liquid crystal. However, it is still difficult to obtain alignment stability and uniformity.

In particular, in case of amorphous silicon (a-Si) TFT-LCD, the driving circuit is attached after a liquid crystal process. In contrast, in case of a liquid crystal on silicon (LCoS) (or polysilicon TFT-LCD), the driving circuit is formed during a back panel process. Thus, in case of an LCoS panel, a liquid crystal alignment process using a well-known electric field alignment technology can be performed after an external controller is connected to the LCoS panel. As such, when stability and uniformity of the liquid crystal are lowered, a compensation procedure therefor is complicated.

SUMMARY OF THE INVENTION

The present invention provides a liquid crystal display (LCD) panel in which alignment stability and uniformity with respect to ferroelectric liquid crystal (FLC) are obtained and a liquid crystal alignment process is easily performed after both a liquid crystal injection process and a package process.

According to an aspect of the present invention, there is provided a liquid crystal display (LCD) panel, the LCD panel including a liquid crystal panel in which liquid crystal is filled between upper and lower substrates and a display electrode and a common electrode face each other where the liquid crystal is filled between the display electrode and the common electrode; a first driving circuit, connected to the liquid crystal panel by a plurality of data lines, which applies a data signal to the liquid crystal panel; a second driving circuit connected to the liquid crystal panel by a plurality of gate lines, which applies a scan signal to sequentially apply the data signal to the liquid crystal panel; an electrode pad unit which applies a signal voltage for alignment of the liquid crystal filled in the liquid crystal panel, to the liquid crystal panel; a first switching circuit, which performs a switching operation to apply a part of the liquid crystal alignment signal voltage applied via the electrode pad unit to the liquid crystal panel via the data lines; a second switching circuit, which performs a switching operation to apply a remaining part of the liquid crystal alignment signal voltage applied via the electrode pad unit to the liquid crystal panel via the gate lines; and first and second buffer circuits, which prevent the liquid crystal alignment signal voltage from being applied backward to the first and second driving circuits.

Additional aspects and/or advantages of the invention will be set forth in part in the description which follows and, in part, will be obvious from the description, or may be learned by practice of the invention.

In an aspect of the present invention, the first switching circuit may be placed between the first driving circuit and the liquid crystal panel, and the second switching circuit may be placed between the liquid crystal panel and the electrode pad unit.

In an aspect of the present invention, the second switching circuit may be placed between the second driving circuit and the liquid crystal panel.

According to an aspect of the present invention, the second buffer circuit may be placed between the second driving circuit and the liquid crystal panel. In this case, the second buffer circuit may be placed between the second driving circuit and the second switching circuit.

According to another aspect of the present invention, the first switching circuit may face the first driving circuit with the liquid crystal panel being placed between the first switching circuit and the first driving circuit. In this case, the second switching circuit may be placed between the liquid crystal panel and the electrode pad unit or between the second driving circuit and the liquid crystal panel. In this case, the first buffer circuit may be placed between the first driving circuit and the liquid crystal panel.

In an aspect of the present invention, the electrode pad unit includes first and second electrode pads, which are connected to the first switching circuit, a third electrode pad, which is connected to the common electrode, and fourth and fifth electrode pads, which are connected to the second switching circuit.

In an aspect of the present invention, the first buffer circuit may include a plurality of signal backflow prevention elements, each of which being connected to each of the plurality of data lines. The second buffer circuit may include a plurality of signal backflow prevention elements, each connected to the respective corresponding gate lines.

In an aspect of the present invention, the first switching circuit may include a plurality of transistors, each of which being connected to each of the plurality of data lines. The second switching circuit may include a plurality of transistors, each connected to the respective corresponding gate lines.

In an aspect of the present invention, because a ferroelectric liquid crystal (FLC) electric field alignment process can be easily performed during a liquid crystal injection process and after a packaging process, uniformity and stability of FLC alignment can be obtained, and when alignment uniformity is lowered, compensation therefor is easily performed.

In an aspect of the present invention, a liquid crystal display panel is provided including a liquid crystal panel comprising a plurality of pixels in liquid crystal to display images, a driving circuit supplying signals to the plurality of pixels to control the display images, an electrode unit to supply an alignment signal voltage to the liquid crystal panel, a switching circuit selectively switching the alignment signal voltage from the electrode unit to the liquid crystal display panel to align liquid crystal in the liquid crystal panel, and a buffer circuit connected to the driving circuit to prevent the alignment signal voltage from flowing to the driving circuit.

According to another aspect of the present invention, a liquid crystal display panel is provided including a liquid crystal panel, a first driver supplying image signals to data lines, a second driver supplying scan signals to gate lines which intersect the data lines to form a matrix in the liquid crystal panel, an electrode unit supplying an alignment signal voltage to the liquid crystal panel, a switching circuit selectively switching the alignment signal voltage from the electrode unit to align liquid crystal in the liquid crystal panel, and a buffer circuit coupled to the first driver and the second driver to prevent the alignment signal voltage from flowing to the first driver and the second driver.

According to another aspect of the present invention, a liquid crystal display panel processing device to process liquid crystal display panels is provided wherein each liquid crystal display panel includes, a liquid crystal panel, a first driver supplying image signals to data lines, a second driver supplying scan signals to gate lines which intersect the data lines to form a matrix in the liquid crystal panel, an electrode unit receiving an alignment signal voltage and supplying the alignment signal voltage to the liquid crystal panel, a switching circuit selectively switching the alignment signal voltage from the electrode unit to align liquid crystal in the liquid crystal panel, and a buffer circuit coupled to the first driver and the second driver to prevent the alignment signal voltage from flowing to the first driver and the second driver, the processing device including a plurality of alignment fixing units holding liquid crystal display panels and applying the alignment signal voltage to the liquid crystal display panel via the electrode unit, wherein during injection of liquid crystal into the liquid crystal panel the alignment signal voltage is applied to align the liquid crystal in a predetermined orientation.

According to another aspect of the present invention, a method of aligning liquid crystal in a liquid crystal display panel is provided, including generating an alignment signal voltage to align liquid crystal in a predetermined orientation, filling the liquid crystal into a liquid crystal display panel having an electrode unit to receive the alignment signal voltage, and applying the alignment signal voltage to the electrode unit of the liquid crystal display panel during the filling the liquid crystal.

In an aspect of the present invention, the filling the liquid crystal includes creating a vacuum around the liquid crystal display panel, and submerging an injection hole of the liquid crystal display panel into liquid crystal, wherein liquid crystal fills the liquid crystal display panel.

In an aspect of the present invention, the applying the alignment signal voltage occurs as the liquid crystal is injected into the liquid crystal display panel.

In an aspect of the present invention, the applying the alignment signal voltage occurs after packaging of the liquid crystal display panel.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
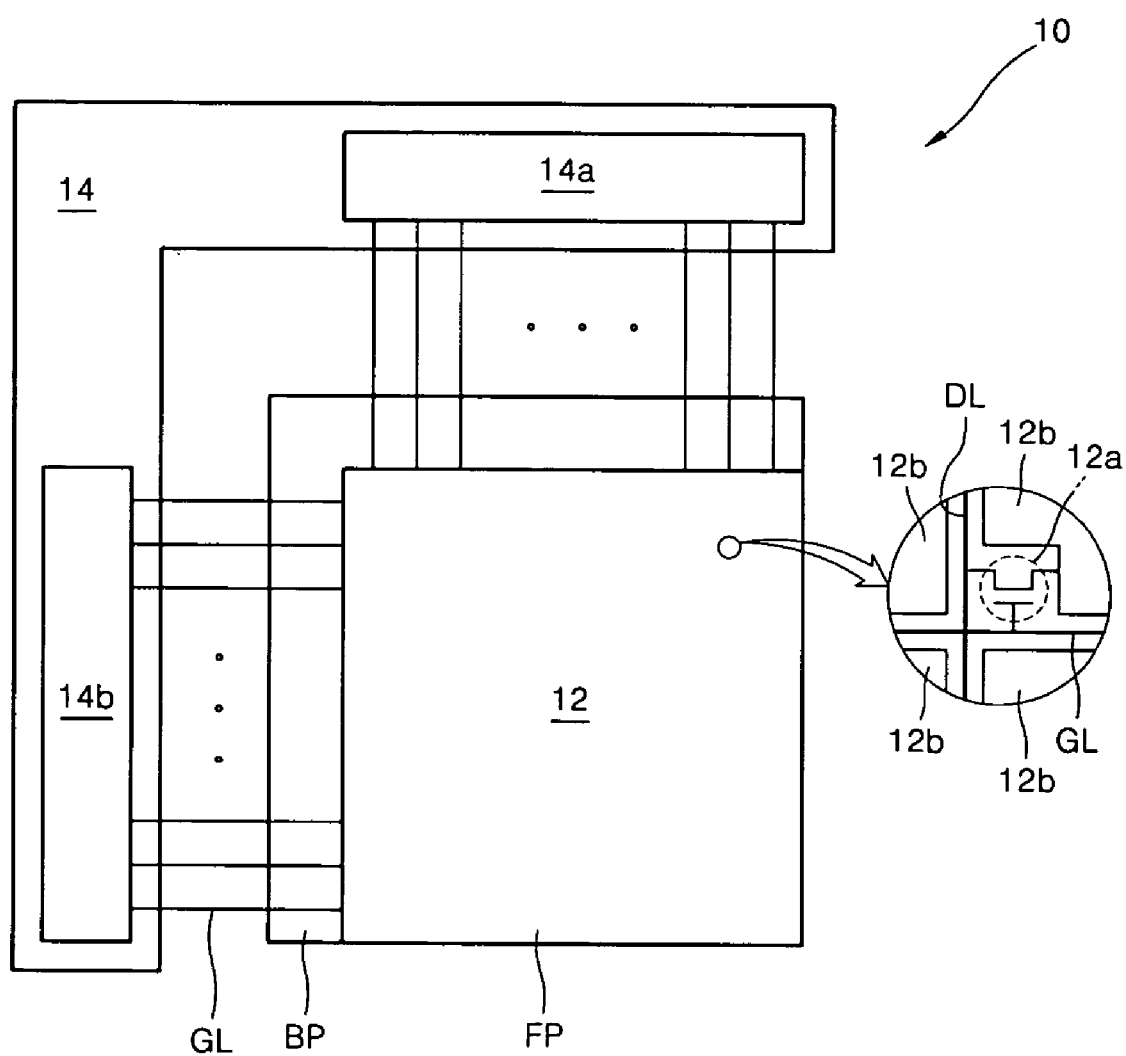
FIG. 1 is a plan view showing a structure of a conventional liquid crystal display (LCD) panel.

Reference will now be made in detail to the embodiments of the present invention, examples of which are illustrated in the accompanying drawings, wherein like reference numerals refer to the like elements throughout. The embodiments are described below to explain the present invention by referring to the figures. Thicknesses of layers or regions shown in the drawings may be exaggerated for clarity.

Figure 2:
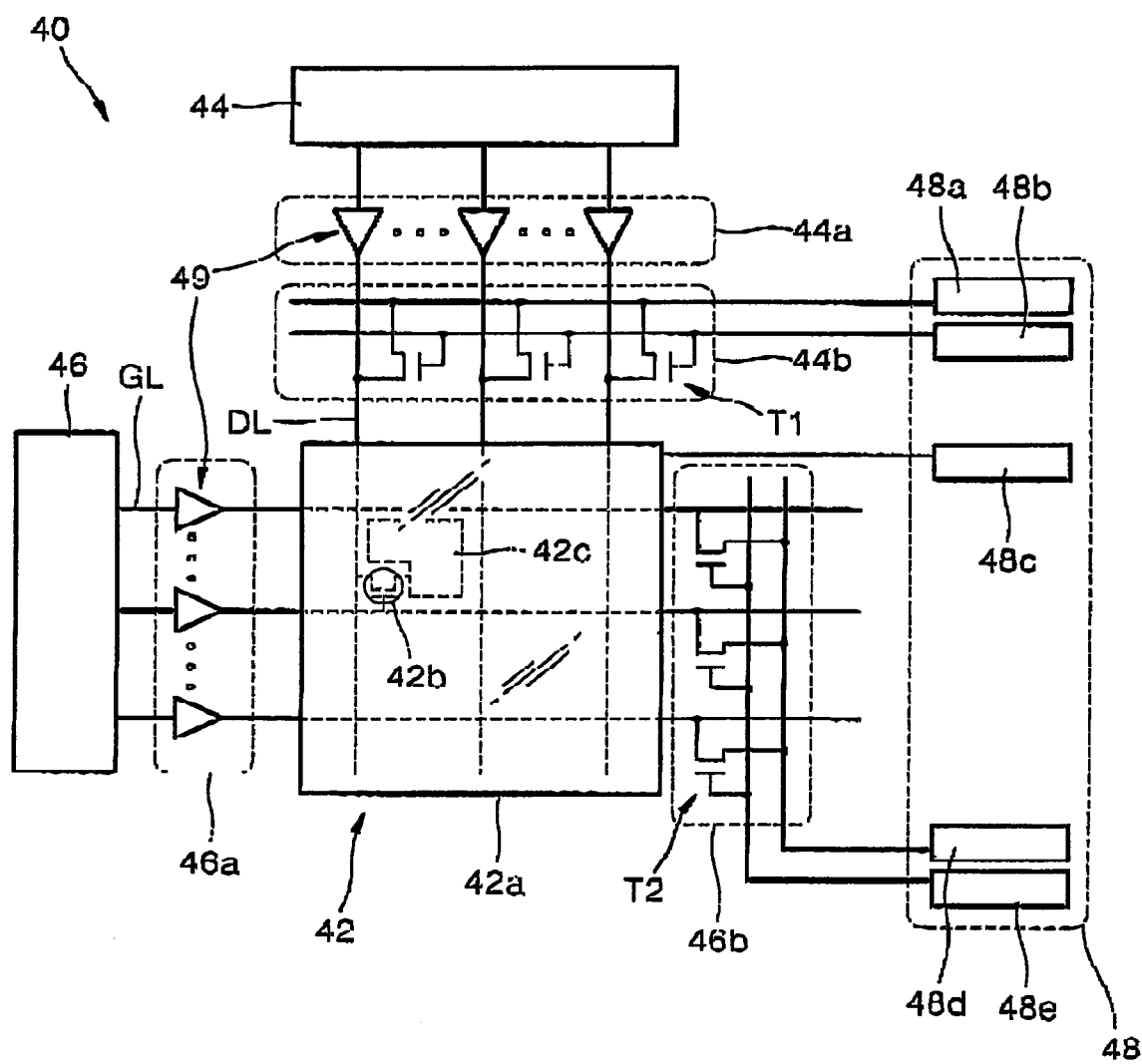
FIG. 2 is a plan view showing a structure of a liquid crystal display (LCD) panel according to an embodiment of the present invention.

Referring to FIG. 2, a liquid crystal display (LCD) panel 40 according to an embodiment of the present invention includes a liquid crystal panel 42, first and second driving circuits 44 and 46, respectively, an electrode pad unit 48 to which an external voltage is applied for liquid crystal alignment, first and second switching circuits 44b and 46b, respectively, which bypass the first and second driving circuits 44 and 46 during liquid crystal alignment, and first and second buffer circuits 44a and 46a, respectively, which prevent signals from flowing backward to the first and second driving circuits 44 and 46 when an alignment voltage is applied via the electrode pad unit 48.

The LCD panel 40 is a liquid crystal on silicon (LCoS) panel or a ferroelectric liquid crystal (FLC) panel. The liquid crystal panel 42 includes an upper glass substrate 42a and a lower substrate (not shown) facing the upper glass substrate 42a. Liquid crystal, for example, nematic liquid crystal (NLC) or FLC is filled in a void between the upper glass substrate 42a and the lower substrate. The lower substrate includes a switching element 42b, which selectively turns on or off signals generated in the first and second driving circuits 44 and 46 to be applied to the liquid crystal, and a display electrode 42c connected to the switching element 42b. One display electrode 42c in each pixel is formed in a matrix shape on the lower substrate together with the switching element 42b. All display electrodes formed on the lower substrate correspond to a transparent common electrode (not shown) attached to a rear side of the upper glass substrate 42a. The switching element 42b is a thin film transistor (TFT), and the display electrode 42c is an ITO electrode. The liquid crystal is filled between the display electrode 42c and the common electrode.

The first driving circuit 44 applies a signal related to a predetermined image to the liquid crystal panel 42, and the second driving circuit 46 sequentially applies a scan signal to each row of the pixels so that the signal is sequentially applied to the liquid crystal panel 42 from up to down, or in a descending order, along each row of pixels arranged in the matrix shape. However, the signal applied to the liquid crystal panel 42 in the first driving circuit 44 is simultaneously applied to all columns of pixels arranged in the matrix shape. In this way, an image of one frame is sequentially displayed from an upper end to a lower end of the liquid crystal panel 42. To this end, the first driving circuit 44 and the liquid crystal panel 42 are connected to each other via data lines DL. There are the same number of data lines DL as the number of columns of pixels formed in the liquid crystal panel 42. In addition, the second driving circuit 46, which is perpendicular to the first driving circuit 44, and the liquid crystal panel 42 are connected to each other via gate lines GL. There are the same number of gate lines GL as the number of rows of pixels formed in the liquid crystal panel 42. Each switching element 42b having the same number as the number of pixels forming one column is connected in parallel to one data line (DL) via its own source. In addition, each switching element 42b having the same number as the number of pixels forming one row is connected in parallel to one gate line GL via the switching element's 42b gate.

The first switching circuit 44b is placed between the first driving circuit 44 and the liquid crystal panel 42 and performs a switching operation so that the voltage applied to the electrode pad unit 48 is applied to the liquid crystal panel 42 via the data lines DL. The first switching circuit 44b includes a plurality of first switching elements T1. A first switching element T1 is connected to each data line DL. A gate and source of each of the first switching elements T1 are connected to the electrode pad unit 48, and a drain of the first switching element T1 is connected to the data line DL. In an embodiment of the present invention, the first switching element T1 is a thin film transistor (TFT) formed during a CMOS process.

The second switching circuit 46b is placed between the liquid crystal panel 42 and the electrode pad unit 48 and performs a switching operation so that the voltage applied to the electrode pad unit 48 is applied to the liquid crystal panel 42 via the gate lines GL. The second switching circuit 46b includes a plurality of second switching elements T2. A second switching element T2 is connected to each gate line GL. A gate and source of each of the second switching elements T2 are connected to the electrode pad unit 48, and a drain of each of the second switching elements T2 is connected to the corresponding gate line GL. In an embodiment of the present invention, the second switching element T2 is a thin film transistor (TFT) formed during a CMOS process.

The first buffer circuit 44a is placed between the first driving circuit 44 and the first switching circuit 44b. When an alignment signal is applied from the electrode pad unit 48 to the liquid crystal panel 42 via the data line DL for liquid crystal alignment, the first buffer circuit 44a prevents the alignment signal from flowing backward to the first driving circuit 44. The first buffer circuit 44a includes a plurality of signal backflow prevention elements 49. Each of the signal backflow prevention elements 49 is, for example, an inverter or a diode, which passes the signal applied from the first driving circuit 44 to the liquid crystal panel 42 and cuts off a signal flowing in the opposite direction. One signal backflow prevention element 49 is connected to each data line DL, respectively.

Unlike the first buffer circuit 44a, the second buffer circuit 46a is placed between the second driving circuit 46 and the liquid crystal panel 42. When a liquid crystal alignment signal is applied from the electrode pad unit 48 to the liquid crystal panel 42 via the gate lines GL via the second switching circuit 46b, the second buffer circuit 46a prevents the liquid crystal alignment signal from flowing to the second driving circuit 46. To this end, the second buffer circuit 46a includes a plurality of signal backflow prevention elements 49. One signal backflow prevention element 49 is connected to each gate line GL, respectively. In an embodiment of the present invention, the signal backflow prevention element connected to the gate line GL is the same as the signal backflow prevention element 49 of the first buffer circuit 44a. However, the signal backflow prevention element connected to the gate lines GL may be different from the signal backflow prevention element 49 of the first buffer circuit 44a.

The electrode pad unit 48 includes first through fifth electrode pads 48a, 48b, 48c, 48d, and 48e. The first and second electrodes 48a and 48b are connected to the source and gate of each of the first switching elements T1 of the first switching circuit 44b. The third electrode pad 48c is connected to the common electrode mounted at a rear side of the upper glass substrate 42a of the liquid crystal panel 42. The fourth and fifth electrode pads 48d and 48e are connected to the source and gate of each of the second switching elements T2 of the second switching circuit 46b. In this way, the LCD panel 40 includes an additional electrode pad unit 48 for liquid crystal alignment so that liquid crystal alignment is more easily performed during a liquid crystal injection process or during a packaging process after the liquid crystal injection process, which will be described later. Although not shown, the LCD panel 40 may further include an alignment signal generation circuit, which is integrated with a control board and is connected to the first through fifth electrode pads 48a, 48b, 48c, 48d, and 48e of the electrode pad unit 48.

When a problem, for example, an alignment defect, occurs in liquid crystal alignment after initial liquid crystal alignment is performed, the alignment defect may be repaired using the alignment signal generation circuit. The alignment signal generation circuit may be used after the packaging process or even at the location of an end user. Thus, the alignment signal generation circuit could automatically correct for alignment defects by applying an alignment signal voltage to the liquid crystal panel.

In the related art, in order to repair the alignment defect, a complicated method of inputting an image on the control circuit corresponding to a waveform to correct alignment is used. The LCD panel 40 includes the alignment signal generation circuit so that the complicated method used in the related art need not be used.

Figure 3:
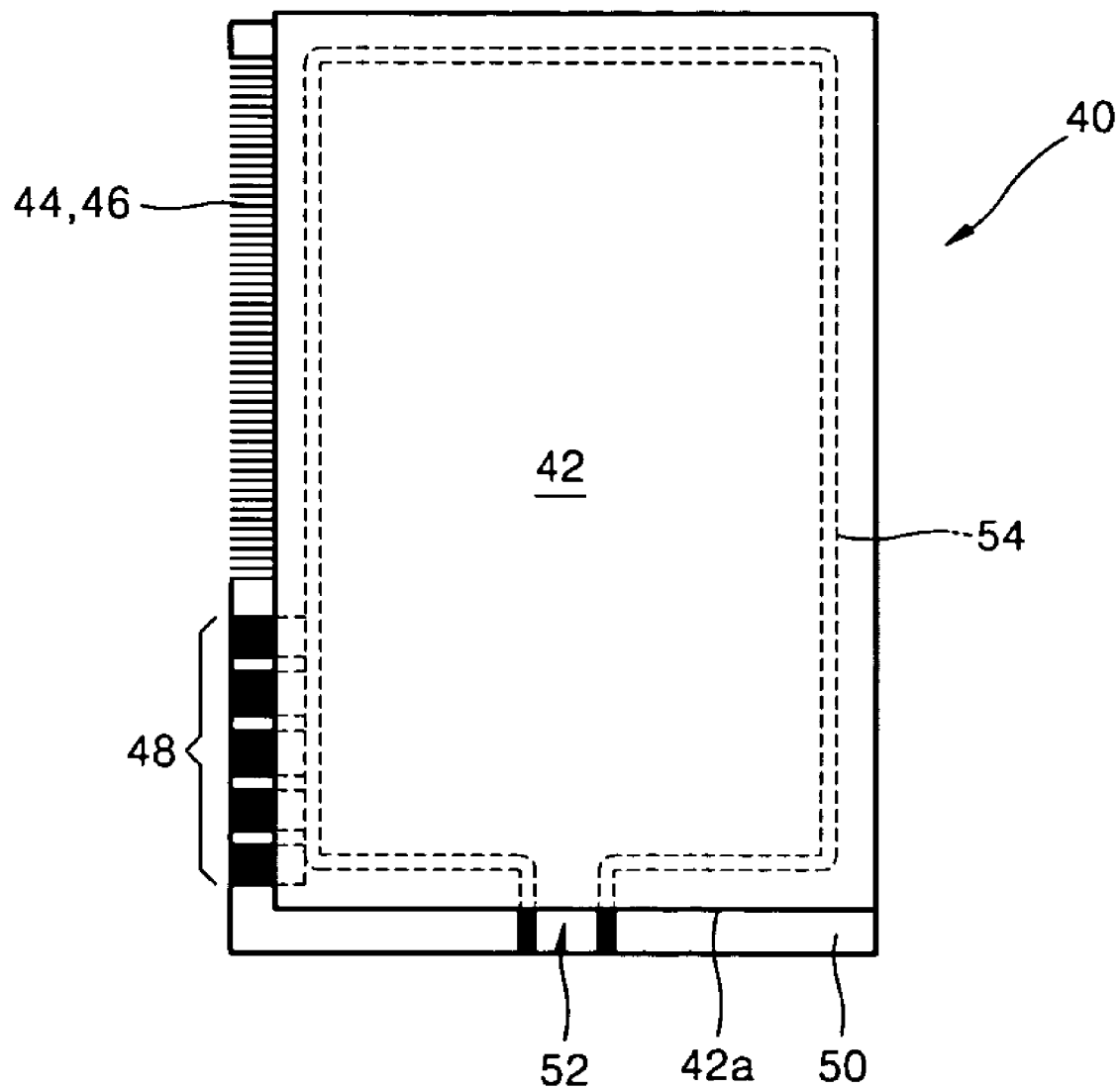
FIG. 3 is a plan view showing a case where the LCD panel of FIG. 2 is used in a liquid crystal on silicon (LCoS) panel.

FIG. 3 is a plan view showing a case where the LCD panel 40 of FIG. 2 is used in a liquid crystal on silicon (LCoS) panel. Referring to FIG. 3, the first and second driving circuits 44 and 46 and the electrode pad unit 48 are provided at one side of the lower substrate 50. Reference numeral 54 denotes a liquid crystal injection region of the liquid crystal panel 42, and reference numeral 52 denotes an injection hole through which liquid crystal is injected into the liquid crystal injection region 54.

Figure 4:
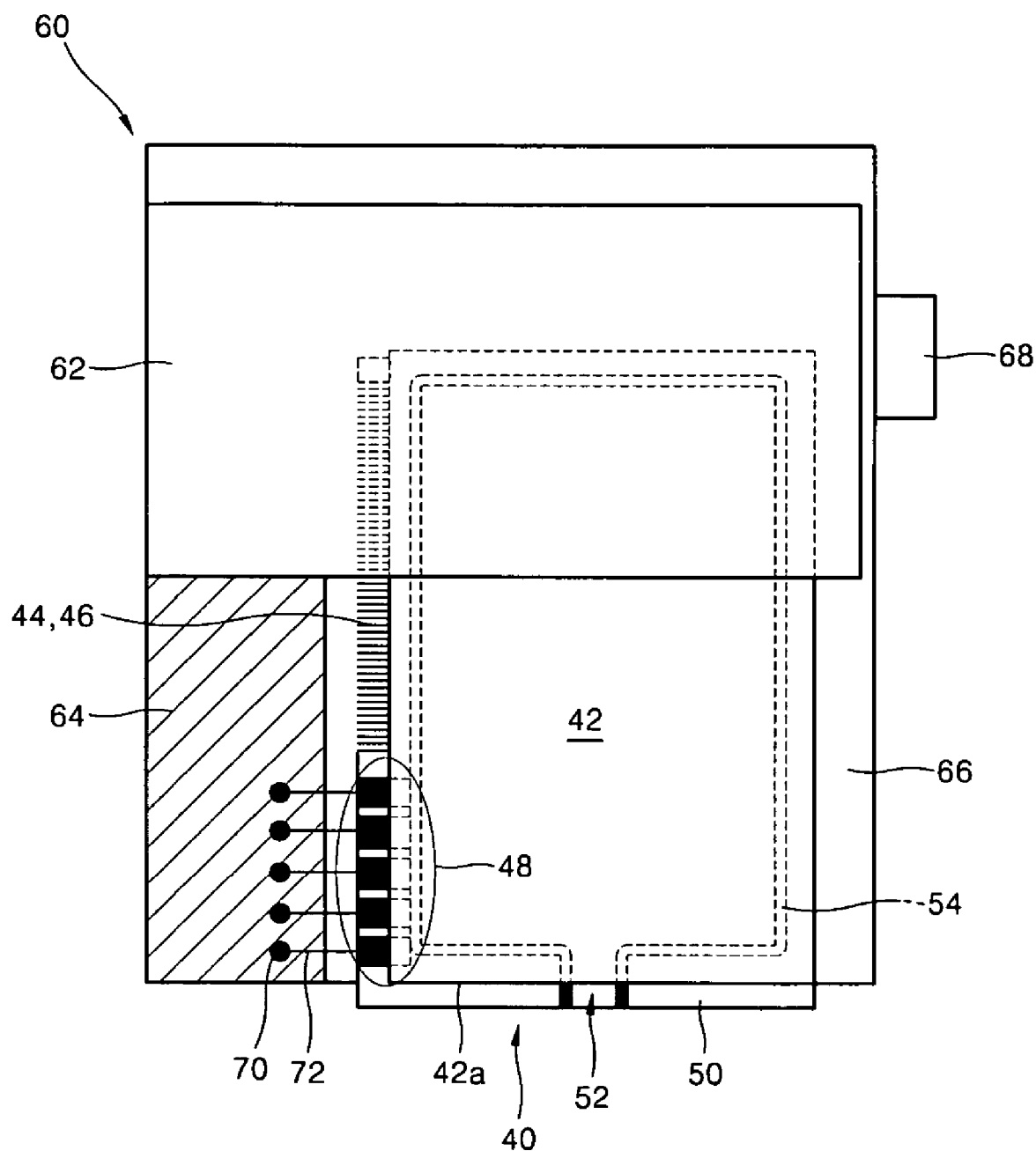
FIG. 4 is a plan view of an LCD panel fixing and signal voltage applying unit, which is used when the LCoS panel of FIG. 3 is mounted in a liquid crystal injection equipment.
Figure 8:
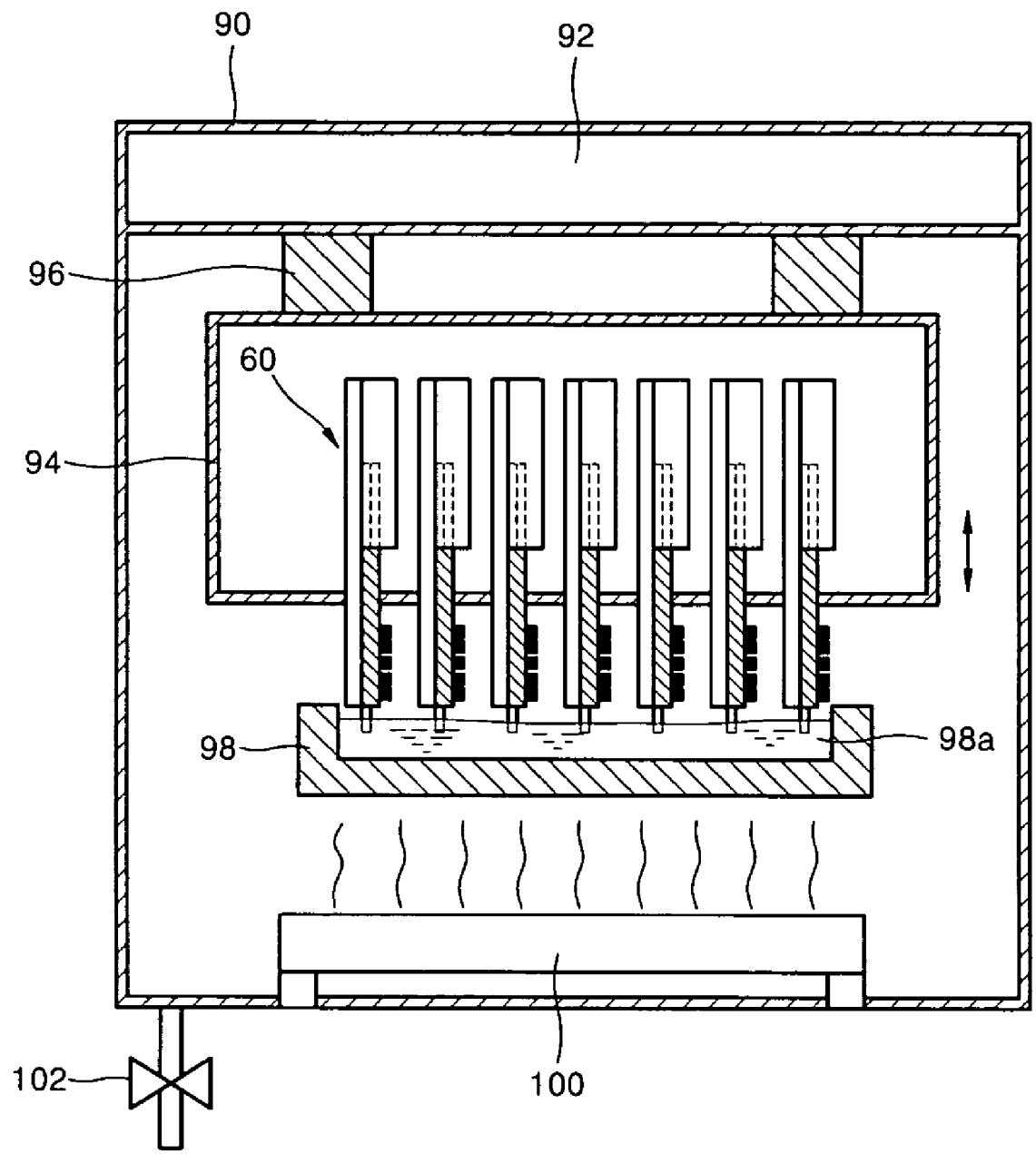
FIG. 8 is a cross-sectional view showing a structure of the liquid crystal injection equipment in which the LCD panel fixing and signal voltage applying unit of FIG. 4 is mounted.

FIG. 4 is a plan view of an LCD panel fixing and signal voltage applying unit 60, which, when liquid crystal is injected into the LCD panel 40 of FIG. 3 using a liquid crystal injection equipment illustrated in FIG. 8, fixes the LCD panel 40 mounted in the liquid crystal injection equipment, and simultaneously applies a predetermined alignment signal voltage for liquid crystal alignment to the LCD panel 40.

Figure 6:
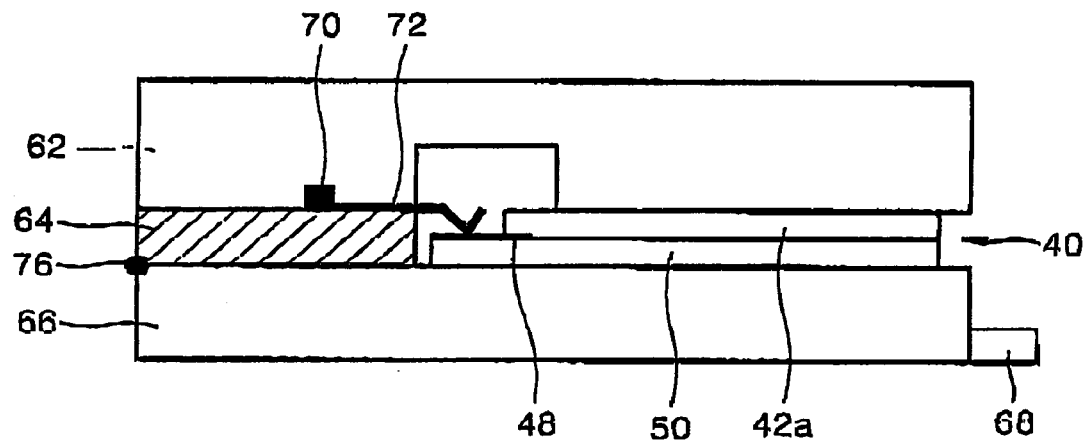
FIG. 6 is a front view of the LCD panel fixing and signal voltage applying unit of FIG. 4.

Reference numerals 62 and 64, respectively, denote first and second portions which together constitute an upper plate of the LCD panel fixing and signal voltage applying unit 60. The first portion 62 covers a part of the liquid crystal panel 42 as well as part of the first and second driving circuits 44 and 46 of the LCD panel 40 mounted in a lower plate 66. The second portion 64 is integrated with the first portion 62. The second portion 64 is placed adjacent to an exposed section of the first and second driving circuits 44 and 46, left exposed by the first portion 62, and the electrode pad unit 48. Five terminals 70 on the second portion 64 are placed in a position corresponding to the electrode pad unit 48, and a contact member 72 having a predetermined length reaching the electrode pad unit 48 is connected to each of the terminals 70. The contact member 72 supplies the alignment signal voltage applied to each of the terminals 70 to the electrode pad unit 48. Contact members 72 contact the first through fifth electrode pads 48a, 48b, 48c, 48d, and 48e, respectively. A connector 68 which connects to a power supply (not shown) and the terminals 70, is placed in a right upper end of the lower plate 66. The alignment signal voltage, applied from the power supply via the connector 68, is applied to the terminals 70. As shown in FIG. 6, when the LCD panel 40 is fixed between the upper plates 62 and 64 and the lower plate 66, the contact members 72 contact each electrode pad of the electrode pad unit 48. Thus, the signal voltage for liquid crystal alignment is applied to each electrode pad of the electrode pad unit 48.

Figure 5:
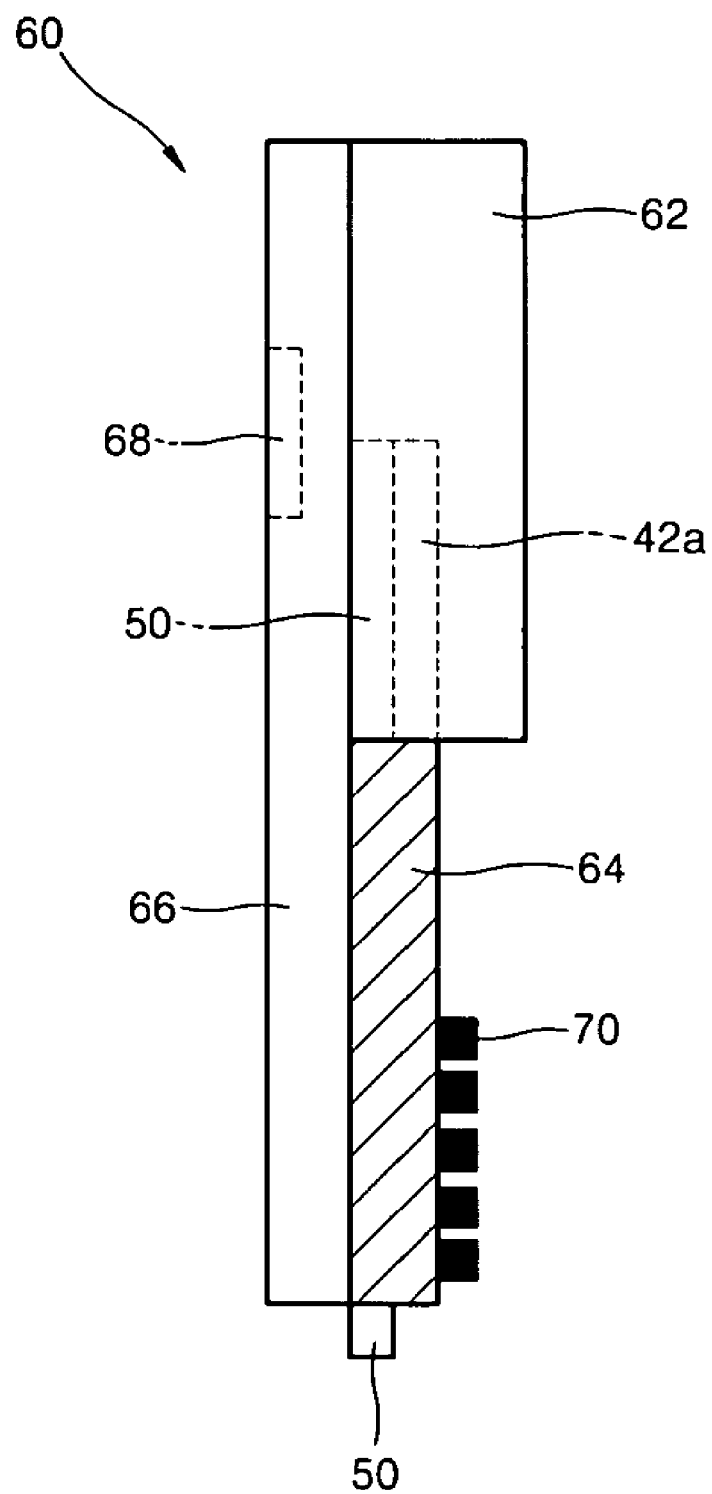
FIG. 5 is a left-side view of the LCD panel fixing and signal voltage applying unit of FIG. 4.

Referring to FIG. 5, the first portion 62 of the upper plate of the LCD panel fixing and signal voltage applying unit 60 is thicker than the second portion 64. The terminals 70 protrude from the surface of the second portion 64. A portion in which the liquid crystal injection hole 52 of the lower substrate 50 of the LCD panel 40 is formed, protrudes downward with respect to the LCD panel fixing and signal voltage applying unit 60. This is because, as shown in FIG. 8, when liquid crystal 98a is injected or drawn into the LCD panel 40 fixed in the LCD panel fixing and signal voltage applying unit 60 (hereinafter, referred to as an applying unit 60), the applying unit 60 is prevented from contacting the liquid crystal 98a as the liquid crystal 98a is injected into the LCD panel 40.

Referring to FIG. 6, the thickness of the second portion 64 of the upper plates 62 and 64 is the same as that of the LCD panel 40. Because the LCD panel 40 is mounted between the upper plates 62 and 64 and the lower plate 66 and is fixed in the applying unit 60, a section of the first portion 62 of the upper plates 62 and 64 that contacts the LCD panel 40 is spaced apart a predetermined interval from a section of the first portion 62 that contacts the lower plate 66.

Because the LCD panel 40 is fixed in the applying unit 60 during the liquid crystal injection process, the predetermined interval between the section that contacts the LCD panel 40 of the first portion 62 and the lower plate 66 may be the maximum thickness of the LCD panel 40. However, the predetermined interval may be made narrower than the thickness of the LCD panel 40 within a range that does not affect the LCD panel 40.

Figure 7:
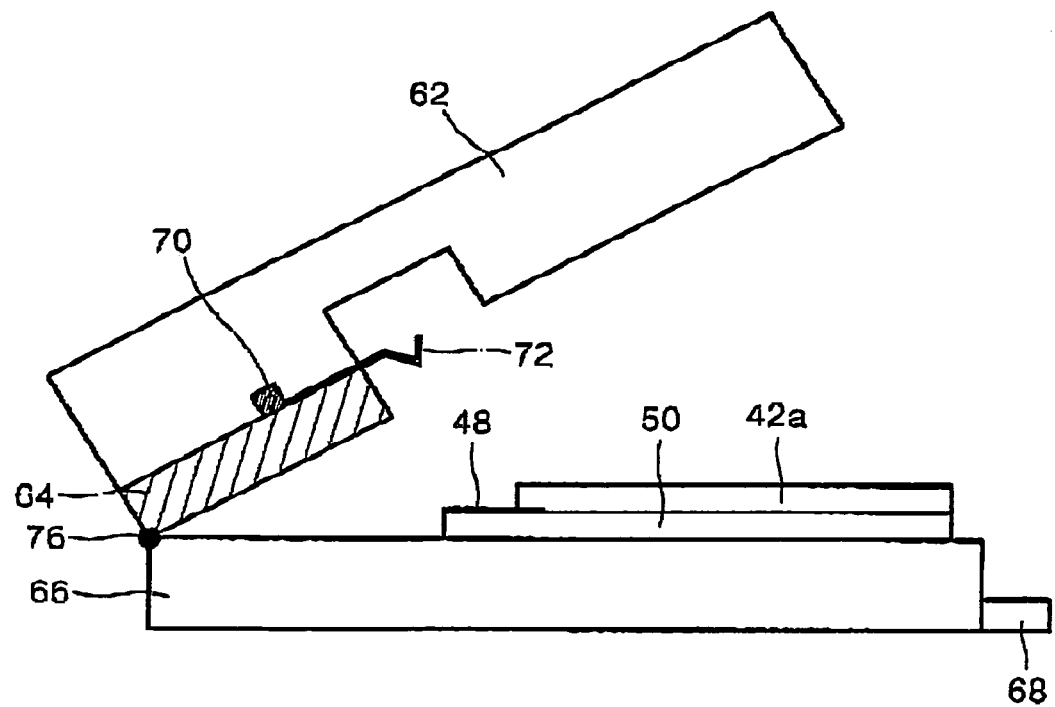
FIG. 7 is a front view showing a state where upper and lower plates of the LCD panel fixing and signal voltage applying unit of FIG. 4 are opened.

In addition, because the electrode pad unit 48 is placed on the lower glass substrate 50, as shown in FIG. 6, the electrode pad unit 48 is placed in a portion lower than the second portion 64 of the upper plates 62 and 64. As such, in an embodiment of the present invention, an end of the contact members 72 connected to the terminals 70 protrudes downward toward the electrode pad unit 48, as shown in FIGS. 6 and 7. Reference numeral 76 denotes a hinge, which is placed in the center of rotation of the upper plates 62 and 64 and the lower plate 66.

FIG. 7 is a front view showing a state where the upper plates 62 and 64 and the lower plate 66 of the applying unit 60 are opened. The LCD panel 40 comprising the lower substrate 50 and the upper glass substrate 42a is placed in a predetermined region of the lower plate 66 corresponding to a right section of the first upper plate 62. FIG. 6 shows a case where the upper plates 62 and 64 cover the lower plate 66 and the LCD panel 40 is fixed by the upper plates 62 and 64 and the lower plate 66.

FIG. 8 shows a case where a plurality of applying units 60 in which LCD panels 40 are fixed and mounted so as to inject liquid crystal into each LCD panel 40, are mounted in the liquid crystal injection equipment. Reference numeral 90 denotes a vacuum chamber.

Referring to FIG. 8, a post movement and signal injection controller 92 (hereinafter, referred to as a controller 92) is placed on the ceiling of a vacuum chamber 90, and a jig 94 in which the applying unit 60 is fixed and mounted, is placed under the post movement and signal injection controller 92. An upper portion of the applying unit 60 is fixed in the jig 94, and a lower portion having the terminals 70 protrudes downward from the jig 94. The controller 92 and the jig 94 are connected to each other via a post 96. The post 96 is moved upward and downward by the controller 90. Thus, in order to move the jig 94 upward and downward, the post 96 moves upward and downward a predetermined distance. A liquid crystal (LC) tray 98 is placed in a lower portion of the vacuum chamber 90 spaced apart the predetermined distance from the bottom surface of the jig 94. Liquid crystal 98a is filled to a predetermined height in the LC tray 98. The liquid crystal 98a is generic liquid crystal or ferroelectric liquid crystal (FLC). In an embodiment of the present invention, the LC tray 98 is spaced apart from the bottom surface of the jig 94 so that the lower substrate 50 of the LCD panel 40 protruding from the applying unit 60 is soaked in the liquid crystal 98a, that is, the liquid crystal injection hole (52 of FIG. 4) of the LCD panel 40 is completely submerged in the liquid crystal 98a. In this example, the applying unit 60 does not contact the liquid crystal 98a.

The connector (68 of FIG. 4) of the applying unit 60, fixed and mounted in the jig 94, is connected to the post 96. Thus, a liquid crystal alignment signal voltage is applied from the controller 92 to the applying unit 60 via the post 96. The liquid crystal alignment signal voltage applied to the applying unit 60 is applied to the electrode pad unit 48 of the LCD panel 40 via the terminals 70 of the applying unit 60 so that alignment of the liquid crystal 98a injected into the LCD panel 40 is performed. In this way, the LCD panel 40 performs liquid crystal alignment during the liquid crystal injection process.

Subsequently, a heater 100 which heats the LC tray 98 and maintains the liquid crystal 98a at a predetermined temperature, is placed on the bottom of the vacuum chamber 90. A valve 102, which exhausts the air from the chamber 90, is placed on the bottom surface of the vacuum chamber 90 on the left side of the heater 100.

As described above, the LCD panel according to the present invention includes an additional electrode pad unit for liquid crystal alignment as well as a driving circuit. As such, a liquid crystal alignment process can be easily performed during a liquid crystal injection process and after a packaging process. Accordingly, when a commercial device using ferroelectric liquid crystal (FLC), for example, an engine for a direct view type LCD and/or an LCoS projection television is manufactured, uniformity and stability of liquid crystal alignment can be obtained. Further, when alignment uniformity is lowered, compensation of the low alignment uniformity is easily performed, and when the present invention is applied to manufacture an FLCoS panel (in progress), an FLC electric field alignment technique can be technology that can be used in mass production.

Figure 9:
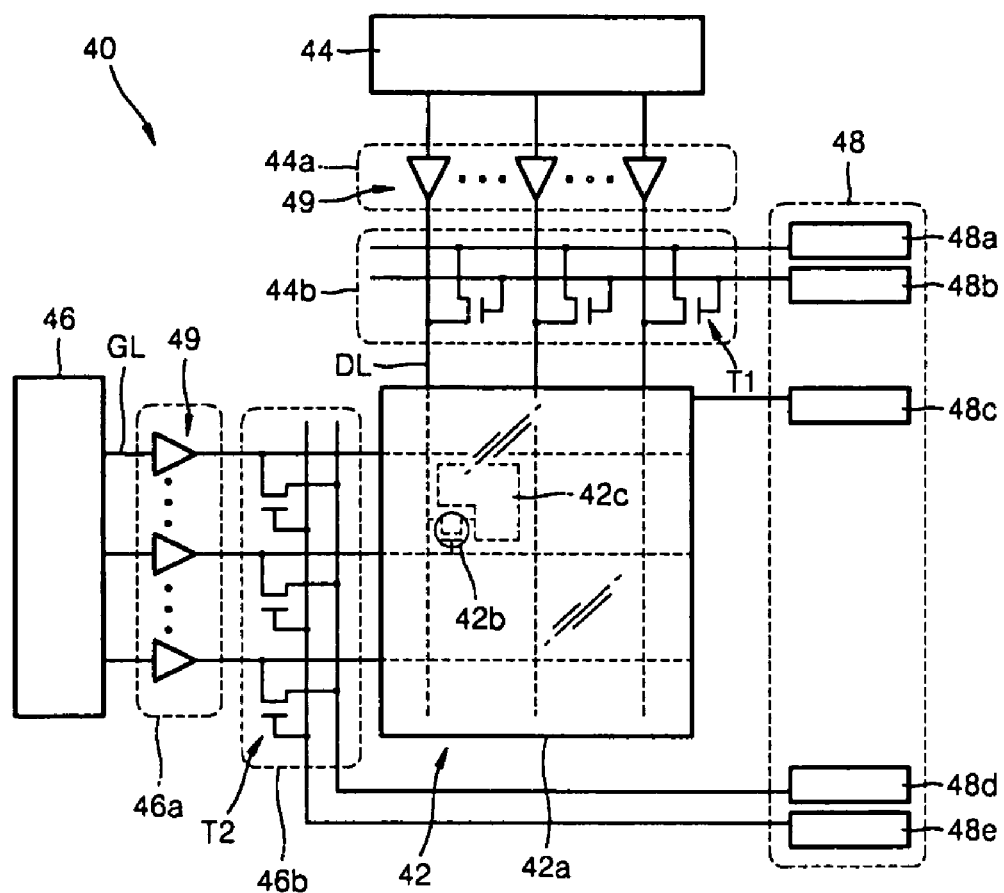
FIG. 9 is a plan view showing a case where the second switching circuit of the LCD panel of FIG. 2 is placed between the second buffer circuit and the LCD panel.
Figure 10:
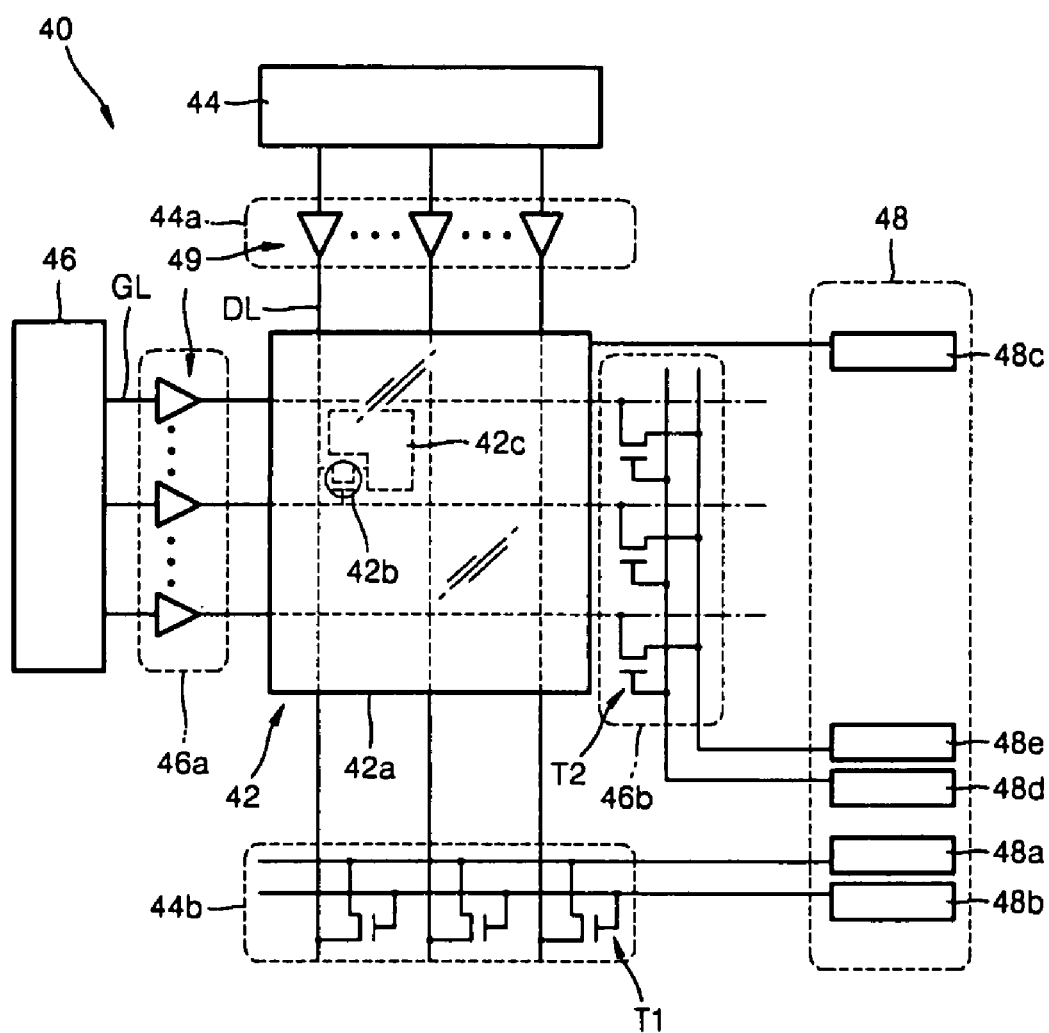
FIG. 10 is a plan view showing a case where the LCD panel of FIG. 2 is placed between the first driving circuit and the first switching circuit.

It is understood that there may be other configurations of the present invention. For example, first and second switching circuits 44b and 46b may be provided conversely. For example, in FIG. 2, the first switching circuit 44b may be connected to the data line DL under the liquid crystal panel 42 as shown in FIG. 10, instead of placing the first switching circuit 44b between the first buffer circuit 44a and the liquid crystal panel 42, and the second switching circuit 46b may be placed between the second buffer circuit 46a and the liquid crystal panel 42 as shown in FIG. 9. Accordingly, it is intended that the scope of the invention be defined by the claims appended hereto.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid crystal display (LCD) panel comprising:
   a liquid crystal panel in which liquid crystal is filled between upper and lower substrates and the liquid crystal is in communication with a display electrode and a common electrode which face each other;
   a first driving circuit connected to the liquid crystal panel by a plurality of data lines and which applies a data signal to the liquid crystal panel;
   a second driving circuit connected to the liquid crystal panel by a plurality of gate lines and which applies a scan signal to sequentially apply the data signal to the liquid crystal panel;
   an electrode pad unit which applies an alignment signal voltage to the liquid crystal panel for alignment of the liquid crystal filled in the liquid crystal panel;
   a first switching circuit which performs a switching operation to apply the alignment signal voltage applied via the electrode pad unit to the liquid crystal panel via the data lines;
   a second switching circuit which performs a switching operation to apply the alignment signal voltage applied via the electrode pad unit to the liquid crystal panel via the gate lines, and
   first and second buffer circuits, which prevent the alignment signal voltage from being applied to the first and second driving circuits,
   wherein the electrode pad unit is directly connected to the first switching circuit and the second switching circuit.

2. The LCD panel of claim 1, wherein the first switching circuit is placed between the first driving circuit and the liquid crystal panel.

3. The LCD panel of claim 2, wherein the first buffer circuit is placed between the first driving circuit and the first switching circuit.

4. The LCD panel of claim 1, wherein the second switching circuit is placed between the liquid crystal panel and the electrode pad unit.

5. The LCD panel of claim 4, wherein the second buffer circuit is placed between the second driving circuit and the liquid crystal panel.

6. The LCD panel of claim 1, wherein the electrode pad unit comprises:
   first and second electrode pads connected to the first switching circuit;
   a third electrode pad connected to the common electrode; and
   fourth and fifth electrode pads connected to the second switching circuit.

7. The LCD panel of claim 1, wherein the first buffer circuit includes a plurality of signal backflow prevention elements, each connected to the respective corresponding plurality of data lines.

8. The LCD panel of claim 1, wherein the second buffer circuit includes a plurality of signal backflow prevention elements each connected to the respective corresponding plurality of gate lines.

9. The LCD panel of claim 1, wherein the first switching circuit includes a plurality of transistors, each connected to the respective corresponding data lines.

10. The LCD panel of claim 1, wherein the second switching circuit includes a plurality of transistors, each connected to the respective corresponding gate lines.

11. The LCD panel of claim 2, wherein the second switching circuit is placed between the liquid crystal panel and the electrode pad unit.

12. A liquid crystal display panel, comprising:
a liquid crystal panel comprising a plurality of pixels in liquid crystal to display images;
a driving circuit supplying signals to the plurality of pixels to control the display images;
an electrode pad unit to supply an alignment signal voltage to the liquid crystal panel;
a switching circuit selectively switching the alignment signal voltage from the electrode unit to the liquid crystal display panel to align liquid crystal in the liquid crystal panel; and
a buffer circuit connected to the driving circuit to prevent the alignment signal voltage from flowing to the driving circuit.
wherein the electrode pad unit is directly connected to the first switching circuit and the second switching circuit.

13. The liquid crystal display panel of claim 12, wherein the liquid crystal is ferroelectric liquid crystal.

* * * * *